US008295815B2

United States Patent
Bright et al.

(10) Patent No.: US 8,295,815 B2
(45) Date of Patent: Oct. 23, 2012

(54) REJECT MOBILE-TERMINATING SMS DUE TO MOBILE NOT REACHABLE FLAG

(75) Inventors: Penny Lynne Bright, Naperville, IL (US); David A. Hasto, St. Charles, IL (US); Hugh Roche, Naperville, IL (US); Marianne Picha, Batavia, IL (US)

(73) Assignee: Alcatel Lucent, Paris (FR)

( * ) Notice: Subject to any disclaimer, the term of this patent is extended or adjusted under 35 U.S.C. 154(b) by 1288 days.

(21) Appl. No.: 12/069,990

(22) Filed: Feb. 14, 2008

(65) Prior Publication Data

US 2009/0209234 A1    Aug. 20, 2009

(51) Int. Cl.
H04W 4/00 (2009.01)
H04L 12/58 (2006.01)
H04M 1/66 (2006.01)

(52) U.S. Cl. .................. 455/412.2; 455/411; 455/466
(58) Field of Classification Search ............. 455/412.2
See application file for complete search history.

(56) References Cited

U.S. PATENT DOCUMENTS

| 5,628,051 | A  | * | 5/1997 | Salin ........................... 455/433 |
| 5,682,600 | A  | * | 10/1997 | Salin ........................ 455/422.1 |
| 6,088,589 | A  | * | 7/2000 | Valentine et al. ............. 455/433 |
| 6,442,159 | B2 | * | 8/2002 | Josse et al. ................... 370/354 |
| 2005/0002407 | A1 | * | 1/2005 | Shaheen et al. .............. 370/401 |

* cited by examiner

*Primary Examiner* — Charles Appiah
*Assistant Examiner* — Natasha Cosme
(74) *Attorney, Agent, or Firm* — Carmen Patti Law Group, LLC

(57) ABSTRACT

The present invention provides a technique to reduce the quantity of paging attempts to mobile terminals. The technique involves periodically rejecting mobile terminating SMS (MT-SMS) messages destined to a mobile subscriber who has already had no paging response success for a previous MT-SMS message until the mobile terminal is reachable or upon the timeout of a Mobile Not Reachable Flag (MNRF) rejection period. The present invention targets mobile subscribers who were out of radio coverage and allows the mobile subscriber to terminate voice calls. Mobile terminal originated activity is not affected. The present invention may co-exist with the existing SMS Center mobile terminating SMS polling mechanism in the market today.

24 Claims, 5 Drawing Sheets

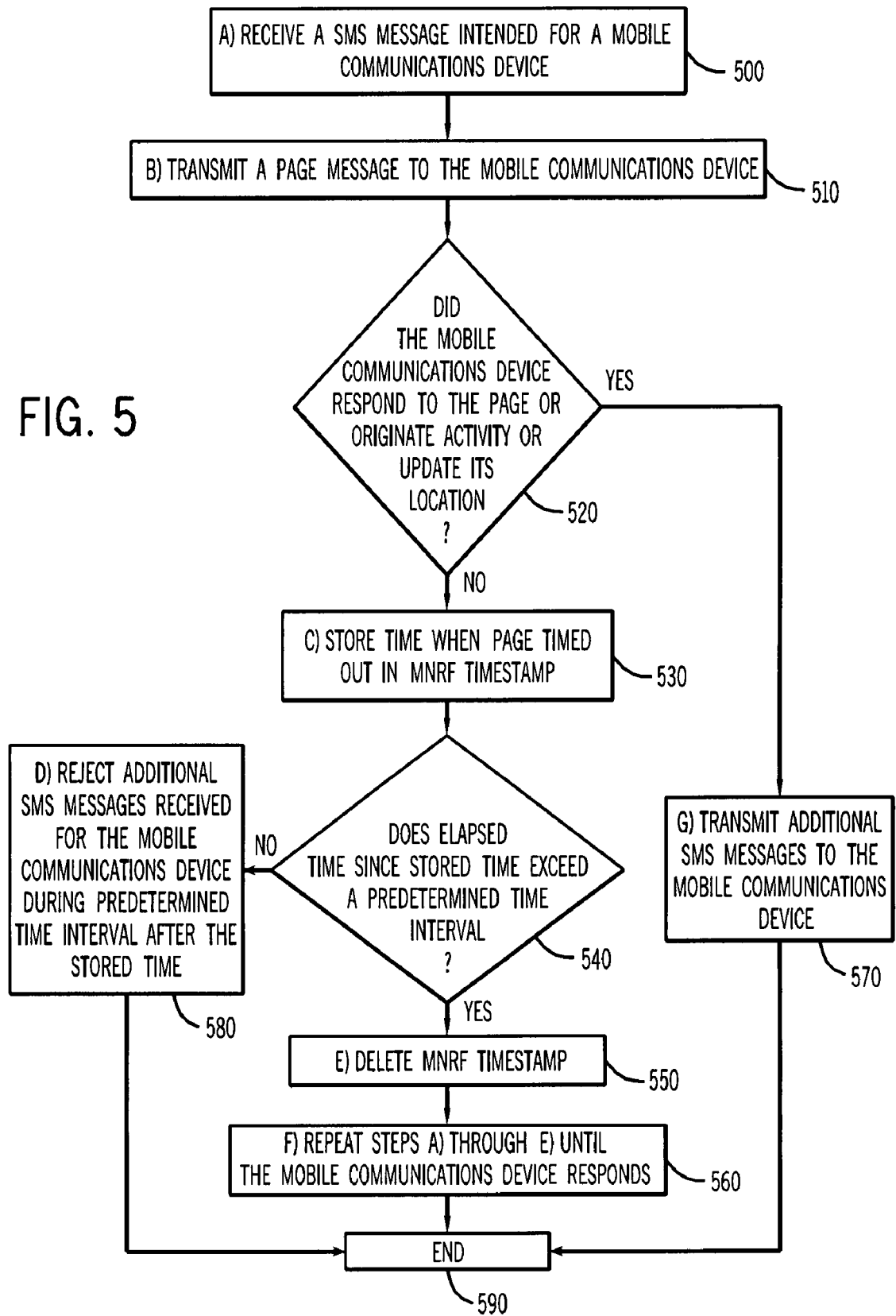

REJECT MOBILE-TERMINATING SMS DUE TO MOBILE NOT REACHABLE FLAG

TECHNICAL FIELD

This invention relates to the art of wireless communications, and more particularly to a technique for reducing the number of SMS paging attempts to a mobile terminal.

BACKGROUND

In wireless communications networks, a large number of mobile terminating Short Message Service (MT-SMS) messages are received by Mobile Switching Centers/Visiting Location Registers (MSCsNVLRs) from SMS Centers. MT-SMS messages may originate from voice mail notifications for mobile subscribers, email messages sent over the Internet for mobile subscribers, and text messages sent to mobile subscribers from other mobile terminals. When the MSC receives a MT-SMS message, the MSC pages the designated mobile terminal. If the designated mobile terminal does not respond immediately and the MSC is provisioned to retry pages, then the MSC repages the designated mobile terminal for each SMS message. Disadvantageously, the MSC continues to receive SMS messages until a successful response is received from the designated mobile terminal.

Illustratively, in some voice mail systems, a text message may be sent to a mobile terminal as a notification of voice mail message. The voice mail system may send the notification to a SMS Center. The SMS Center sends a SMS message to a MSC to alert the user of a mobile terminal of a waiting message regularly in an increasing interval until a successful response is received from the mobile terminal. Initially, the quantity of these messages is numerous, e.g., every minute for 5 times, then every two minutes for five times, then every three minutes for five times, and after 5 minutes the interval may decrease to one time every five minutes, etc. Eventually, the quantity of SMS pages decreases, e.g., one time per hour. As more voice calls are saved in voice mail, more page attempts may be made to notify users of messages waiting. When there is more than one SMS Center sending MT-SMS messages to MSCs, e.g., voice mail notifications and/or email messages from the Internet and/or text messages from other mobile terminals, for the same subscriber at the same time, then the quantity of pages becomes exorbitant.

Disadvantageously, the MSCNVLR is not always aware when the mobile terminal becomes reachable, e.g. after going into a tunnel, unless the mobile terminal initiates some activity. Consequently, many SMS Centers continue to page the mobile terminal by re-transmitting MT-SMS messages regularly, which may become exorbitant especially when more than one SMS Center is involved. Also disadvantageously, mobile subscribers may not be aware that they are missing messages.

SUMMARY

It has been recognized, in accordance with the principles of the invention, that the problems of the prior art can be overcome by a Reject MT-SMS Due To Mobile Not Reachable Flag system. More specifically, the present invention provides a method having the steps of a) receiving a Short Message Service (SMS) message intended for a mobile communications device, b) transmitting a page message to alert the mobile communications device of the SMS message, c) storing a time when the mobile communications device does not respond to the page message, and d) rejecting additional Short Message Service (SMS) messages received for the mobile communications device during a predetermined interval after the stored time.

Also, the present invention provides an apparatus having a) means for receiving a Short Message Service (SMS) message intended for a mobile communications device, b) means for transmitting a page message to alert the mobile communications device of the SMS message, c) means for storing a time when the mobile communications device does not respond to the page message, and d) means for rejecting additional Short Message Service (SMS) messages received for the mobile communications device during a predetermined interval after the stored time.

The present invention provides another method having the steps of a) receiving, via a mobile switching center (MSC), a Short Message Service (SMS) message intended for a mobile communications device, b) transmitting, via the MSC, a page message to alert the mobile communications device of the SMS message, c) storing, via a visitor location register (VLR), a time when the mobile communications device does not respond to the page message, and d) rejecting, via the MSC, additional Short Message Service (SMS) messages received for the mobile communications device during a predetermined interval after the stored time.

The present invention provides another apparatus having a) a mobile switching center (MSC) operable to i) receive a Short Message Service (SMS) message intended for a mobile communications device and ii) transmit a page message to alert the mobile communications device of the SMS message, and b) a visitor location register (VLR) operable to store a time when the mobile communications device does not respond to the page message, c) wherein the MSC rejects additional Short Message Service (SMS) messages received for the mobile communications device during a predetermined interval after the stored time.

DESCRIPTION OF THE DRAWINGS

FIG. 5 shows an illustrative flow chart for a method of operating the Reject MT-SMS Due To MNRF System arranged in accordance with the principles of the invention.

DETAILED DESCRIPTION

The present invention provides a technique to reduce the quantity of paging attempts to mobile terminals. The technique involves periodically rejecting mobile terminating SMS (MT-SMS) messages destined to a mobile subscriber who has already had no paging response success for a previous MT-SMS message until the mobile terminal is reachable or upon the timeout of a Mobile Not Reachable Flag (MNRF) rejection period. The present invention targets mobile subscribers who were out of radio coverage and allows the mobile subscriber to terminate voice calls. Mobile terminal originated activity is not affected. The present invention may co-exist with the existing SMS Center mobile terminating SMS polling mechanism, i.e., repeated paging by the SMS Center, in the market today.

Figure 1:
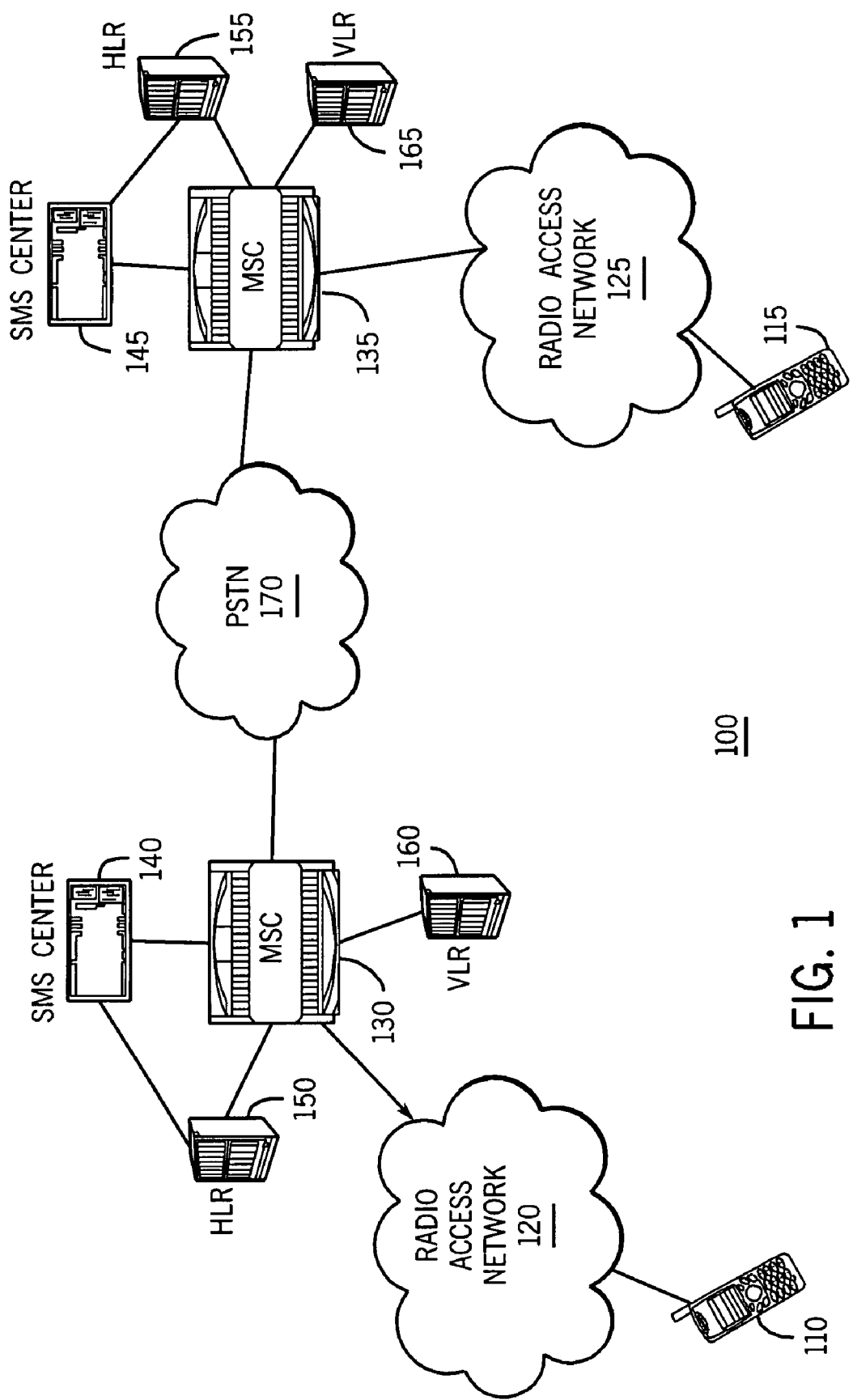
FIG. 1 shows an illustrative embodiment of a Reject MT-SMS Due To MNRF System arranged in accordance with the principles of the invention.

FIG. 1 shows an illustrative embodiment of a Reject MT-SMS Due To Mobile Not Reachable Flag (MRRF) system arranged in accordance with the principles of the invention. In FIG. 1, the Reject MT-SMS Due To MNRF system 100 shows mobile device 110 which connects to mobile switching center (MSC) 130 via radio access network (RAN) 120. MSC 130 connects to RAN 120, home location register (HLR) 150, visiting location register (VLR) 160, Short Message Service (SMS) Center 140 and the Public Switched Telephone Network (PSTN) 170. Also, MSC 135 connects to RAN 125, HLR 155, VLR 165, SMS Center 145 and PSTN 170. Mobile device 115 connects to MSC 135 via RAN 125. SMS Center 140 connects to HLR 150 and SMS Center 145 connects to HLR 155. PSTN 170 routes calls to and from mobile subscribers through the MSC 130 and MSC 135.

Mobile devices 110 and 115 are mobile communications devices capable of wirelessly connecting to a communications network, e.g., PSTN 170, via a telephone switching network having wireless technologies that may include one or more mobile base stations, e.g., RAN 120 and RAN 125, connected to one or more mobile switches, e.g., MSC 130 and MSC 135, allowing a user of mobile devices 110 and 115 to communicate, via a user interface on mobile devices 110 and 115, with another party. The user interface of each of mobile devices 110 and 115 may include an audio interface, e.g., a microphone and speakers, a visual interface, e.g., a display, and a user input interface, e.g., a keyboard or touch pad, and a pointing device, e.g., a navigation key set.

Mobile devices 110 and 115 may be operated in a given geographical area which may be a) a visiting area served by a visited MSC by which a subscriber roams into or b) the subscriber's home service area served by a home MSC. Mobile devices 110 and 115 are capable of sending and receiving voice calls, email, SMS, microbrowser messages or text messaging, etc. Mobile devices 110 and 115 may use an air interface standard such as Code Division Multiple Access (CDMA), Time Division Multiple Access (TDMA), Universal Mobile Telecommunications System (UMTS), Global System for Mobile Communications (GSM), etc., not shown, or any other standard or protocol which supports voice calls, email, SMS, microbrowser messages or text messaging. Mobile devices 110 and 115 may be capable of multi-band operation, i.e., two radio access technologies.

In one embodiment of the invention, mobile devices 110 and 115 may be small, light-weight portable mobile telephones, e.g., pocket telephone invention, mobile devices 110 and 115 may be mobile telephones installed in an engine-driven vehicle and supplied with current from the vehicle electrical system. In an alternative embodiment of the invention, mobile devices 110 and 115 may be smart phones, personal digital assistance (PDA) devices, notebook computers, two-way pagers or other suitable wireless communications devices.

RAN 120 and RAN 125 are networks of base stations, i.e., radio transmitters/receivers, base station controllers, etc., that provide bi-directional wireless connectivity for wireless communication devices, e.g., mobile devices 110 and 115, within a geographical area, or a cell, i.e., a basic geographic unit of a cellular system, proximate to RAN 120 and RAN 125. RAN 120 and RAN 125 may use an air interface standard that is complementary to the air interface standard of mobile devices 110 and 115 so that calls may be connected from mobile devices 110 and 115 to a mobile switching center, e.g., MSC 130 and MSC 135, which may connect the calls to PSTN 170. RAN 120 and RAN 125, in one embodiment, comprise one or more of a GSM/UMTS standard base station.

MSC 130 and MSC 135 are telecommunications switches capable of switching calls between a plurality of endpoints via a wireless network connected to the PSTN, e.g., PSTN 170. MSC 130 and MSC 135 have call control components, not shown, that monitor all mobile terminal calls, e.g., calls from mobile devices 110 and 115, within their serving area, tracks the location of all mobile phone-equipped vehicles traveling within its service area, arranges handoffs between switches, keeps track of billing information, etc. MSC 130 and MSC 135 are capable of broadcasting pages to mobile terminals via RANs, e.g., RAN 120 and RAN 125, to alert the mobile terminals of a call or text messages, e.g., MT-SMS messages. MSC 130 and MSC 135, in one embodiment, comprise one or more of a GSM/UMTS standard—Mobile Switching Center.

MSC 130 and MSC 135 may each be connected to their own home location register, e.g., HLR 150 and HLR 155, which contains profiles of subscribers in a serving area of each MSC. The profiles may contain a record of the names, telephone numbers, address, account status and telephone features subscribed to, etc., of all wireless subscribers that utilize each respective MSC as their home MSC. HLR 150 and HLR 155 may be utilized not only when a call is being terminated to a subscriber within a coverage area supported by a cellular provider of record, but also to verify the legitimacy and to support subscriber features when a subscriber is away from his or her home area. HLR 150 and HLR 155 may generate messages according to a network protocol and process requests to obtain requested information. HLR 150 and HLR 155 may each be geographically distributed or there may be mated pairs of HLR 150 and HLR 155 to ensure survivability.

SMS Center 140 and SMS Center 145 serve as control points for the delivery of SMS messages. SMS Center 140 and SMS Center 145 may have databases, not shown, that store text messages received for designated subscribers, and location and service information for subscribers. The databases may contain information regarding where to send text messages that arrive at SMS Center 140 and SMS Center 145. For example, the databases may serve to link subscriber names, mobile terminals and landline telephone numbers, e-mail addresses, and internet protocol addresses. SMS Center 140 and SMS Center 145 may be able to query the HLR to obtain routing information for the delivery of SMS messages.

VLR 160 and VLR 165 track mobile terminals, e.g., mobile devices 110 and 115, currently receiving service in the serving coverage area of their respective MSCs, which is different from the home serving area of the mobile terminal subscriber. Whenever a mobile terminal enters an area served by VLR 160 and VLR 165 and registers there, VLR 160 and VLR 165 inform the mobile terminal's HLR, e.g., HLR 150 and HLR 155, of the change in the mobile terminal's location. In addition, the HLR downloads the service profile of the roaming mobile terminal as well as other information necessary for call termination at the mobile terminal to VLR 160 and VLR 165. During call delivery, the location and profile information in the HLR is utilized to route incoming calls to the mobile terminal.

When a mobile terminal does not provide a valid response to a MT-SMS page, i.e., when the page times out, a serving MSC may set a mobile terminal not reachable flag (MNRF) in the VLR, e.g., VLR 160 and VLR 165, per GSM/UMTS standards. In the present invention, the VLR records a timestamp of the MNRF along with the MNRF when the mobile terminal does not provide the valid response to the MT-SMS page. When the MNRF is set, the MSC will reject MT-SMS messages for a predetermined interval, e.g., 2 minutes, hereinafter known as the "Reject MT-SMS period", started after the timestamp, causing a delay in the delivery of page messages and, thus, reducing the paging load. The Reject MT-SMS period may be controlled by a provisionable graphical user interface (GUI) option which provides a flow control mechanism at the MSC/VLR to reduce the paging load.

During the Reject MT-SMS period, only MT-SMS messages are rejected until the period elapses or until the mobile terminal becomes reachable again. The mobile terminal is considered "reachable" for MT-SMS messages when the MSC receives a) any type of location update, e.g., a power up, a periodic location update or a normal location area update, b) any mobile origination activity, e.g., a call or SMS message or a service request, or c) any successful page response. In any of these cases, the MSC clears the MNRF condition in the VLR and sends a Mobile Application Part (MAP) Ready for Short Message (if MAP v2 or v3 is used) or MAP Note Subscriber Present (if MAP v1 is used) to the HLR as done today. The HLR then notifies the SMS Center(s) in its Message Waiting Data. Voice calls from the mobile terminal, MAP Provide Subscriber Location queries and MAP Provide Subscriber Info queries may still result in pages during the Reject MT-SMS period.

When additional MT-SMS messages are received for the mobile terminal during the Reject MT-SMS period, the MSC and/or the VLR may compare the elapsed time since the MNRF timestamp to the Reject MT-SMS period. If the elapsed time is less than the Reject MT-SMS period, then the MT-SMS message is rejected, i.e, dropped. After the reject MT-SMS period has elapsed, i.e., the elapsed time is greater than the Reject MT-SMS period, the MSC may allow MT-SMS messages, which are processed and paged, until no page response(s) are received again, and then the timestamp is re-set, i.e., cleared or deleted, and the rejection of MT-SMS messages begins again for the next provisioned Reject MT-SMS period. The process may repeat until the mobile terminal becomes reachable.

A Service Provider's personnel may provision the amount of the reduction in the load of page attempts due to SMS messages by setting the GUI configurable Reject MT-SMS period. To chose the optimum Reject MT-SMS period, the Service Provider must consider the tradeoffs between the GUI setting choices. The advantages and disadvantages of different Reject MT-SMS periods are described hereinbelow:

A value of zero: Advantage: A low value increases the speed at which the mobile's MT-SMS messages, e.g., voicemail notifications, get through to a called mobile terminal that was MNRF and which has become reachable, but hasn't initiated any new activity, e.g., location update/originations/paging response. Disadvantage: there is no SMS flow control and every MT-SMS message results in a page to the mobile terminal which can get exorbitant, especially when there is more than one SMS Center sending messages.

Any value other than zero: Advantage: Values other than zero may assist in limiting the frequency of page attempts, especially when there is more than one SMS Center attempting to deliver MT-SMS messages after a mobile terminal has not responded to a page attempt for a previous MT-SMS message, i.e., MNRF. The frequency of MT-SMS page attempts is limited to 1 during the Reject MT-SMS period until the mobile terminal becomes reachable.

A low value. e.g., <5 minutes: Advantage: A low value increases the speed at which the mobile's MT-SMS messages, e.g., voicemail notification, get through to a called mobile terminal that was MNRF and which has become reachable, but hasn't initiated any new activity, e.g., location update/originations/paging response. Disadvantage: The lower the value, the higher the cost in terms of the quantity of page messages.

A high value, e.g. >10 minutes: Advantage: A high value decreases the quantity of page attempts for MT-SMS messages to a mobile terminal that has MNRF set in the VLR. The higher value may be especially helpful if the RAN is in an overload situation and cannot accommodate new pages. Disadvantage: The higher the value, the more time it takes to deliver a voice mail notification/MT-SMS successfully. If the value is increased by the Service Provider to a value of 10 minutes or more, it is recommended that the Service Provider subsequently decrease this value to the default value after the paging success rate improves.

Default value: is a conservative value used to reduce the number of pages for a period of time. A default value of 1 minute provides no benefit if only 1 SMS Center is attempting MT-SMS retransmissions, and has a benefit that it reduces the number of pages by 11 to 20 minute interval if 2 SMS Centers are attempting MT-SMS retransmissions. A default value of 2 minutes has a benefit that it reduces the number of pages by 3 per 20 minute interval if only 1 SMS Center is attempting MT-SMS retransmissions, and by 14 per 20 minute interval if 2 SMS Centers are attempting MT-SMS retransmissions. A default value of 3 minutes has a benefit that it reduces the number of pages by 6 per 20 minute interval if only 1 SMS Center is attempting MT-SMS retransmissions, and by 17 per 20 minute interval if 2 SMS Centers are attempting MT-SMS retransmissions. A recommended default value of 2 minutes, which may not be noticeable to a subscriber, causes a delay of approximately 2 minutes to deliver MT-SMS messages to the previously unreachable subscriber.

As stated previously, the Reject MT-SMS period may be provisioned with a GUI on a per VLR basis. In another embodiment of the invention, the Reject MT-SMS period may be provisioned with a separate GUI on a per RAN element basis, e.g., per base station or per radio access controller or per wireless local area network (LAN) control element. Illustratively, a base station in an overload condition may be provisioned with a Reject MT-SMS period of 15 minutes, while other base stations in the RAN may be provisioned with a Reject MT-SMS period of 2 minutes. In yet another embodiment of the invention, RAN elements, e.g., base stations or radio access controllers or wireless LAN control elements, etc., may be provisioned based on a first Reject MT-SMS period with a first GUI and a VLR may be provisioned based on a second Reject MT-SMS period with a second GUI. Illustratively, a base station in an overload condition may be provisioned by a first GUI with a Reject MT-SMS period of 15 minutes, while the VLR may be provisioned by a second GUI with a Reject MT-SMS period of 2 minutes.

Figure 2:
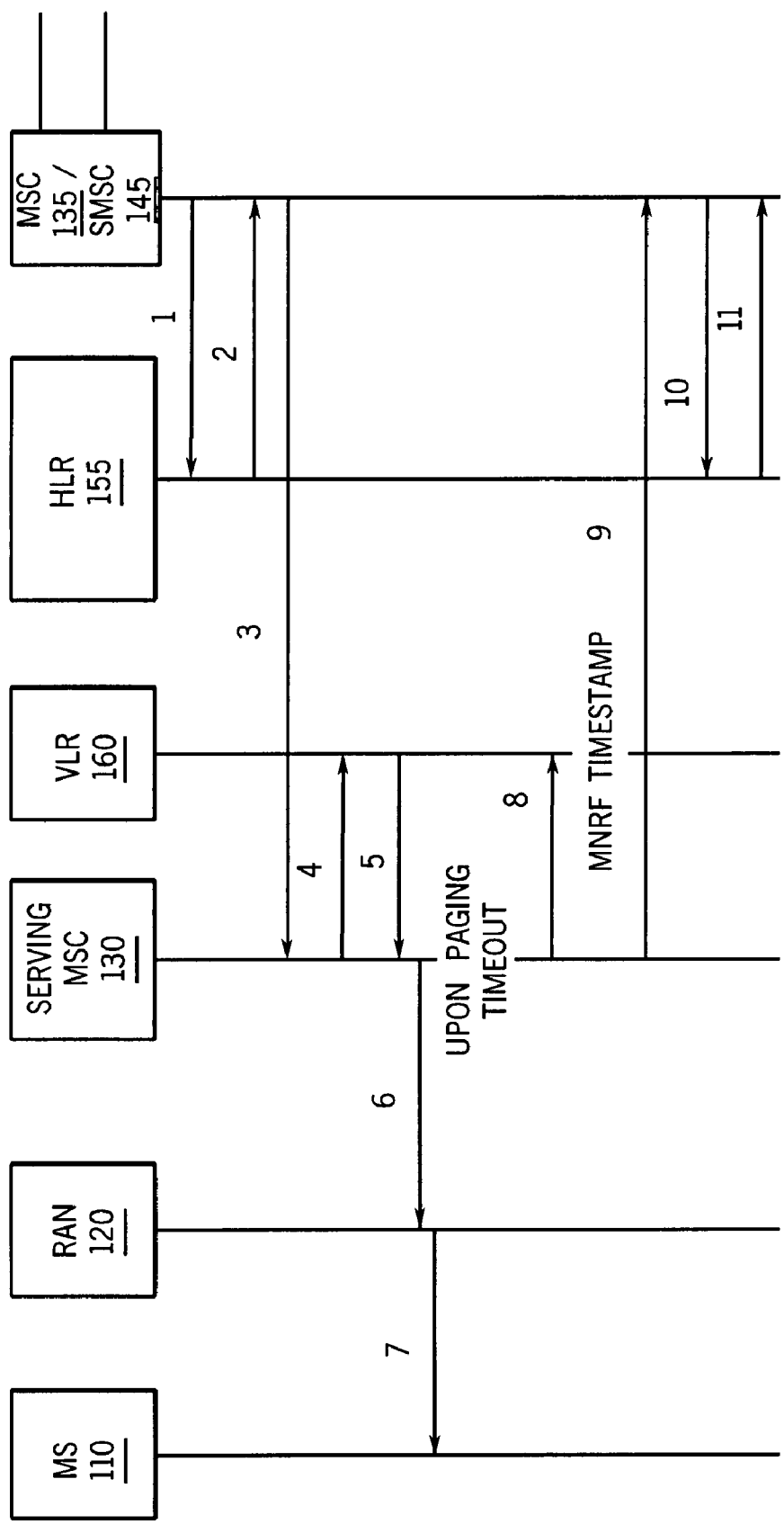
FIG. 2 shows an illustrative call flow for a method of operating the present invention arranged in accordance with the principles of the invention.

FIG. 2 shows an illustrative call flow for a method of operating the present invention arranged in accordance with the principles of the invention. In FIG. 2, a MT-SMS transfer procedure for forwarding a short message from a SMS Center to a mobile communications device, e.g., mobile device 110, is shown.

At 1, when a short message addressed to mobile device 110 is received by the SMS Center 145, SMS Center 145 sends a request to HLR 155 to send routing number for the MSC serving mobile device 110. SMS Center 145, acting as a MSC or by sending the request through MSC 135, sends the request to the HLR 155.

At 2, HLR 155 sends an acknowledgement to SMS 145 containing the routing number to MSC 130.

At 3, SMS Center 145, acting as a MSC or by sending the request through MSC 135, sends the MT-SMS message to MSC 130 intended for mobile device 110.

At 4, MSC 130 queries VLR 160 to page mobile device 110.

At 5, VLR 160 sends a request to transmit a page to alert mobile device 110 of the MT-SMS message.

At 6, the RAN broadcasts the page for mobile device 110.

At 7, mobile device 110 has been paged, but mobile device 110 does not respond to the page.

At 8, the page has timed out. VLR 160 records a mobile terminal not reachable flag (MNRF) and a timestamp for the MNRF.

At 9, MSC 130 forwards a short message error with absent subscriber to MSC135/SMS Center 145.

At 10, SMS Center 145, acting as a MSC or by sending the request through MSC 135, sends a short message delivery status report to HLR 155 indicating that mobile device 110 is absent along with the MSC 130's address.

At 11, HLR 155 sends an acknowledgement to MSC 135/SMS 145.

Figure 3:
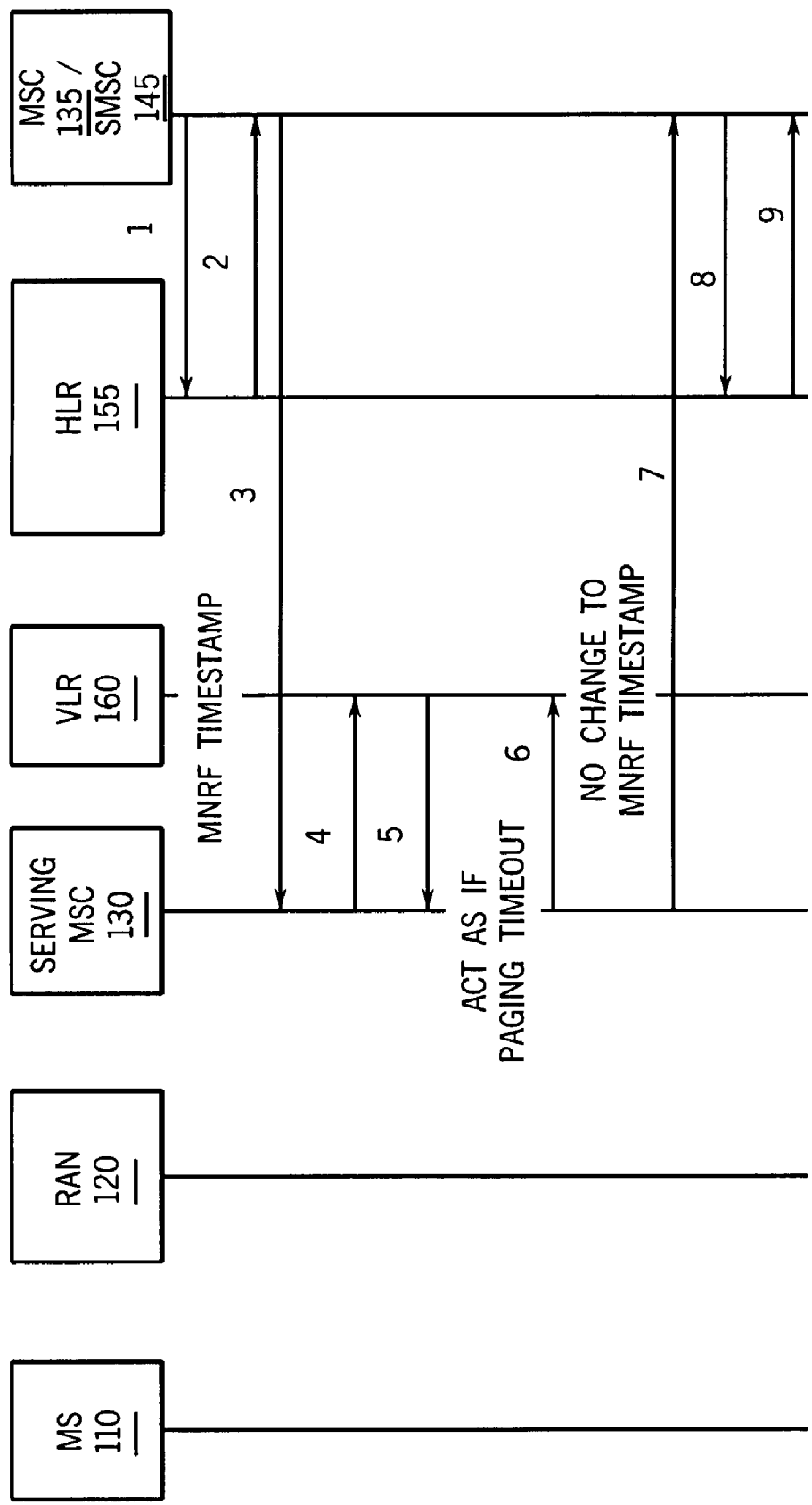
FIG. 3 shows another illustrative call flow for a method of operating the present invention arranged in accordance with the principles of the invention.

FIG. 3 shows another illustrative call flow for a method of operating the present invention arranged in accordance with the principles of the invention. In FIG. 3, a MT-SMS message is received by the MSC within the MT-SMS Reject period.

At 1, when a short message addressed to mobile device 110 is received by the SMS Center 145, SMS Center 145, acting as a MSC or by sending the request through MSC 135, sends a request to HLR 155 to send routing number for the MSC serving mobile device 110.

At 2, HLR 155 sends an acknowledgement to SMS 145 containing the routing number to MSC 130.

At 3, SMS Center 145, acting as a MSC or by sending the request through MSC 135, sends the MT-SMS message to MSC 130 intended for mobile device 110.

At 4, MSC 130 and/or VLR 160 compare the elapsed time since the MNRF timestamp to the Reject MT-SMS period. Since the elapsed time is less than the Reject MT-SMS period, then the MT-SMS message is rejected, i.e., dropped.

At 5, VLR 160 sends MSC 130 a message indicating that mobile device 110 is still absent.

At 6, MSC 130 sends an acknowledgement to VLR 160.

At 7, MSC 130 sends a message to MSC 135/SMS 145 indicating that mobile device 110 is still absent.

At 8, SMS Center 145, acting as a MSC or by sending the request through MSC 135, sends a short message delivery status report to HLR 155 indicating that mobile device 110 is absent along with the MSC 130's address.

At 9, HLR 155 sends an acknowledgement to MSC 135/SMS 145.

Figure 4:
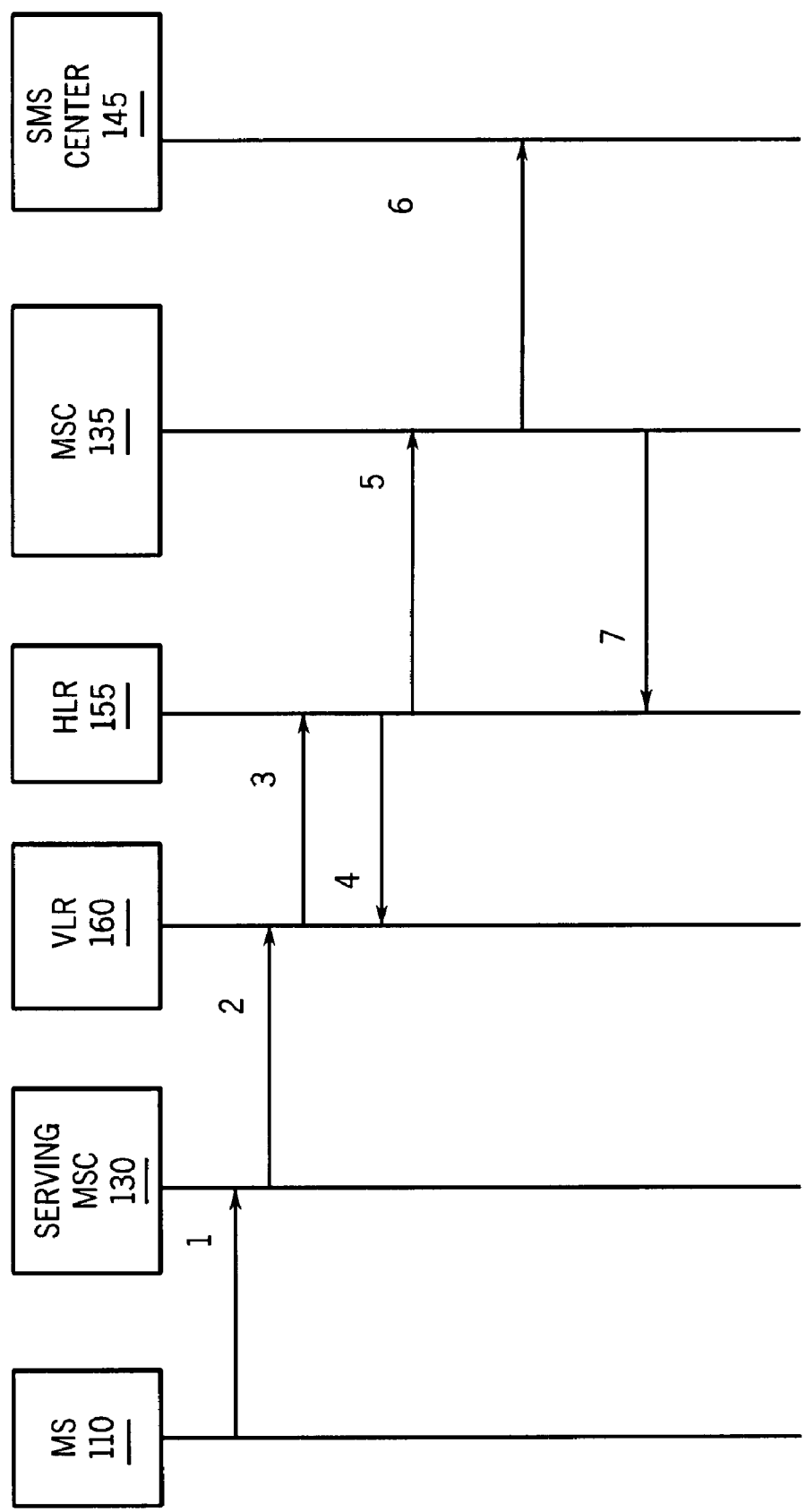
FIG. 4 shows yet another illustrative call flow for a method of operating the present invention arranged in accordance with the principles of the invention.

FIG. 4 shows yet another illustrative call flow for a method of operating the present invention arranged in accordance with the principles of the invention. In FIG. 4, the mobile terminal becomes active after a short message transfer has failed because the mobile terminal was not reachable.

At 1, mobile device 110 initiates a service request or receives a successful page response or MSC 130 receives a location update for mobile device 110.

At 2, MSC 130 prompts VLR 160 to clear the MNRF flag and the MNRF time stamp for mobile device 110. Also, VLR 160 updates the location of mobile device 110.

At 3, VLR 160 sends either a "MAP Ready for Short Message", i.e., mobile present, or an "Update Location" message for mobile device 110 to HLR 155.

At 4, HLR 155 sends an acknowledgement to VLR 160.

At 5, HLR 155 sends an alert to SMS Center 145 or MSC 135, indicating mobile device 110 is now reachable.

At 6, SMS Center 145/MSC 135 receives the alert indicating mobile device 110 is now reachable.

At 7, SMS Center 145, acting as a MSC or by sending a message through MSC 135, sends an acknowledgement to HLR 155.

FIG. 5 shows an illustrative flow chart for a method of operating the Reject MT-SMS Due To MNRF System 100 arranged in accordance with the principles of the invention. The process is entered in step 500 when a MT-SMS message intended for a mobile communications device, e.g., mobile device 110 (FIG. 1), is received by a MSC, e.g., MSC 130 (FIG. 1).

In step 510 (FIG. 5), MSC 130 (FIG. 1) transmits a page message to alert mobile device 110 (FIG. 1) of the MT-SMS message.

In step 520 (FIG. 5), it is necessary to determine whether mobile device 110 (FIG. 1) is reachable, i.e., responded to the page or originated activity or updated its location.

If the test result in conditional branch point 520 (FIG. 5) is NO, indicating that mobile device 110 (FIG. 1) is not reachable, i.e., mobile device 110 (FIG. 1) did not respond to the page or originate activity or update its location, then control is passed to step 530 (FIG. 5). If the test result in step 520 is YES, indicating that mobile device 110 (FIG. 1) is reachable, i.e., mobile device 110 (FIG. 1) did respond to the page or originate activity or update its location, then control is passed to step 570 (FIG. 5).

In step 530 (FIG. 5), a VLR, e.g., VLR 160 (FIG. 1), stores the time when the page timed out in a MNRF timestamp. A predetermined interval after the stored time, i.e., the Reject MT-SMS period, controlled by a provisionable GUI option set VLR 160 (FIG. 1) or im the RAN or a combination of VLR 160 and the RAN reduces the paging load.

In step 540 (FIG. 5), it is necessary to determine whether an elapsed time since the stored time exceeds the Reject MT-SMS period.

If the test result in conditional branch point 540 (FIG. 5) is NO, indicating that the elapsed time does not exceed the Reject MT-SMS period, then control is passed to step 580 (FIG. 5). If the test result in step 540 is YES, indicating the elapsed time does exceed the Reject MT-SMS period, then control is passed to step 550 (FIG. 5).

In step 550 (FIG. 5), VLR 160 (FIG. 1) deletes the MNRF timestamp, after the predetermined interval.

In step 560 (FIG. 5), the steps of the process are repeated until mobile device 110 (FIG. 1) responds to the page or originates activity. Then control is passed to step 590 (FIG. 5).

In step 570 (FIG. 5), MSC 130 (FIG. 1) transmits additional MT-SMS messages to mobile device 110 (FIG. 1). Then control is passed to step 590 (FIG. 5).

In step 580 (FIG. 5), MSC 130 (FIG. 1) rejects additional MT-SMS messages received for mobile device 110 (FIG. 1) during the Reject MT-SMS period after the stored time when mobile device 110 (FIG. 1) does not respond to the page message. Then control is passed to step 590 (FIG. 5).

The process is exited in step 590.

Those skilled in the art will recognize that embodiments of the invention may be used in an Internet Protocol (IP) Multimedia System (IMS) environment. Illustratively, the quantity of Session Invitation Protocol (SIP) messages in an IMS network may be filtered during a given time interval in the manner of the present invention. Also, those skilled in the art will recognize that a Serving General packet radio service Support Node (SGSN) may invoke a similar procedure as described herein rather than the serving MSC 130 shown in FIG. 2, FIG. 3 and FIG. 4.

In practice, telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a different order, or steps may be added, deleted, or modified.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method, comprising the steps of:
   a) receiving a Short Message Service (SMS) message intended for a mobile communications device;
   b) transmitting a page message to alert the mobile communications device of the SMS message;
   c) storing a time when the mobile communications device does not respond to the page message; and
   d) dropping additional SMS messages received for the mobile communications device during a predetermined interval after the stored time.

2. The method of claim 1 wherein the predetermined interval is at least 2 minutes.

3. The method of claim 2 further comprising the steps of:
   e) deleting the stored time after the predetermined interval;
   f) repeating steps a), b), c), d) and e) until the mobile communications device responds to the page message.

4. The method of claim 3 further comprising the step of transmitting the additional SMS messages to the mobile communications device after the mobile communications device responds to the page message.

5. The method of claim 1 further comprising the step of transmitting the additional SMS messages to the mobile communications device upon receipt of i) a location update or ii) a service request or iii) a response to the page message, from the mobile communications device.

6. The method of claim 1 wherein the dropping step further comprises the steps of:
   comparing an elapsed time since the stored time to the predetermined interval;
   dropping the additional SMS messages when the elapsed time is less than the predetermined interval; and
   transmitting the additional SMS messages to the mobile communications device when the elapsed time is greater than the predetermined interval.

7. The method of claim 1 wherein the predetermined interval is provisioned on a per visitor location register (VLR) basis.

8. The method of claim 1 wherein the predetermined interval is provisioned on a per radio access network element basis.

9. The method of claim 1 wherein the predetermined interval comprises a first predetermined interval and a second predetermined interval, and wherein at least one radio access network element is provisioned based on the first predetermined interval, and wherein at least one visitor location register (VLR) is provisioned based on the second predetermined interval.

10. The method of claim 9 wherein the first predetermined interval and the second predetermined interval are different.

11. An apparatus, comprising:
   means for receiving a Short Message Service (SMS) message intended for a mobile communications device;
   means for transmitting a page message to alert the mobile communications device of the SMS message;
   means for storing a time when the mobile communications device does not respond to the page message; and
   means for dropping additional SMS messages received for the mobile communications device during a predetermined interval after the stored time.

12. The apparatus of claim 11 wherein the predetermined interval is at least 2 minutes.

13. The apparatus of claim 12 further comprising means for deleting the stored time after the predetermined interval.

14. The apparatus of claim 11 further comprising means for transmitting the additional SMS messages to the mobile communications device upon receipt of i) a location update or ii) a service request or iii) a response to the page message, from the mobile communications device.

15. The apparatus of claim 11 further comprising:
   means for comparing an elapsed time since the stored time to the predetermined interval;
   means for dropping the additional SMS messages when the elapsed time is less than the predetermined interval; and
   means for transmitting the additional SMS messages to the mobile communications device when the elapsed time is greater than the predetermined interval.

16. The apparatus of claim 11 wherein the predetermined interval is provisioned on a per visitor location register (VLR) basis.

17. The apparatus of claim 11 wherein the predetermined interval is provisioned on a per radio access network element basis.

18. The apparatus of claim 11 wherein the predetermined interval comprises a first predetermined interval and a second predetermined interval, and wherein at least one radio access network element is provisioned based on the first predetermined interval, and wherein at least one visitor location register (VLR) is provisioned based on the second predetermined interval.

19. The apparatus of claim 18 wherein the first predetermined interval and the second predetermined interval are different.

20. The apparatus of claim 11 wherein the mobile communications device is selected from the group consisting of a) a mobile telephone, b) a personal digital assistance (PDA) device, c) a two-way pager, d) a smart phone, e) a notebook computer and f) a portable media player.

21. A method, comprising the steps of:
   a) receiving, via a mobile switching center (MSC), a Short Message Service (SMS) message intended for a mobile communications device;
   b) transmitting, via the MSC, a page message to alert the mobile communications device of the SMS message;
   c) storing, via a visitor location register (VLR) connected to the MSC, a time when the mobile communications device does not respond to the page message; and
   d) dropping, via the MSC, additional SMS messages received for the mobile communications device during a predetermined interval after the stored time.

22. A network, comprising:
   a switch configured to a) receive a Short Message Service (SMS) message intended for a mobile communications device and to b) transmit a page message to alert the mobile communications device of the SMS message; and a visitor location register (VLR) connected to the switch, the VLR being configured to store a time when the mobile communications device does not respond to the page message;

wherein the switch is configured to drop additional SMS messages received for the mobile communications device during a predetermined interval after the stored time.

23. The network of claim 22 wherein the switch is a mobile switching center (MSC) or a Serving General packet radio service Support Node (SGSN).

24. The network of claim 22 wherein the predetermined interval is configurable via a graphical user interface.

* * * * *